US009734447B1

(12) United States Patent
Diev et al.

(10) Patent No.: US 9,734,447 B1
(45) Date of Patent: Aug. 15, 2017

(54) GENERATING ACCURATE REASON CODES WITH COMPLEX NON-LINEAR MODELING AND NEURAL NETWORKS

(71) Applicant: SAS INSTITUTE INC., Cary, NC (US)

(72) Inventors: Vesselin Diev, San Diego, CA (US); Brian Lee Duke, Poway, CA (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

(21) Appl. No.: 15/497,398

(22) Filed: Apr. 26, 2017

Related U.S. Application Data

(63) Continuation of application No. PCT/US2015/058403, filed on Oct. 30, 2015.

(60) Provisional application No. 62/072,999, filed on Oct. 30, 2014.

(51) Int. Cl.
*G06F 15/18* (2006.01)
*G06N 3/08* (2006.01)
*G06N 3/04* (2006.01)
*G06N 5/04* (2006.01)
*H04L 29/08* (2006.01)

(52) U.S. Cl.
CPC .............. *G06N 3/0481* (2013.01); *G06N 3/08* (2013.01); *G06N 5/045* (2013.01); *H04L 67/10* (2013.01)

(58) Field of Classification Search
USPC .......................................................... 706/25
See application file for complete search history.

(56) References Cited

U.S. PATENT DOCUMENTS

| 6,067,552 A * | 5/2000 | Yu ...................... G06F 17/30882 707/999.005 |
| 7,379,926 B1 | 5/2008 | Belniak et al. |
| 7,472,126 B2 * | 12/2008 | Bangel .............. G06F 17/30345 |

(Continued)

FOREIGN PATENT DOCUMENTS

WO  2016/070096 A1  5/2016

OTHER PUBLICATIONS

A Decision Tree Scoring Model Based on Genetic Algorithm and K-Means Algorithm Defu Zhang; Stephen C. H. Leung; Zhimei Ye 2008 Third International Conference on Convergence and Hybrid Information Technology Year: 2008, vol. 1 pp. 1043-1047, DOI: 10.1109/ICCIT.2008.110 IEEE Conference Publications.*

(Continued)

*Primary Examiner* — Michael B Holmes
(74) *Attorney, Agent, or Firm* — Kilpatrick Townsend & Stockton LLP

(57) ABSTRACT

A computer system computes a score for a received data exchange and, in accordance with a neural network and input variables determined by received current exchange and history data, the computed score indicates a condition suitable for a denial. A set of attribution scores are computed using an Alternating Decision Tree model in response to a computed score that is greater than a predetermined score threshold value for the denial. The computed score is provided to an assessment unit and, if the computed score indicates a condition suitable for the denial and if attribution scores are computed, then a predetermined number of input variable categories from a rank-ordered list of input variable categories is also provided to the assessment unit of the computer system.

30 Claims, 14 Drawing Sheets

(56) References Cited

U.S. PATENT DOCUMENTS

| | | | |
|---|---|---|---|
| 7,849,068 B2* | 12/2010 | Bangel | G06F 17/30345 707/706 |
| 8,131,615 B2* | 3/2012 | Diev | G06Q 20/40 705/35 |
| 8,355,896 B2* | 1/2013 | Kumar | G06Q 10/10 703/2 |
| 8,805,737 B1* | 8/2014 | Chen | G06Q 40/00 235/380 |
| 9,231,979 B2* | 1/2016 | Duke | H04L 63/20 |
| 9,594,907 B2* | 3/2017 | Duke | G06F 21/566 |
| 2005/0010543 A1 | 1/2005 | Lukomnik et al. | |
| 2006/0020814 A1 | 1/2006 | Lieblich et al. | |
| 2007/0055671 A1* | 3/2007 | Bangel | G06F 17/30345 |
| 2009/0024638 A1* | 1/2009 | Bangel | G06F 17/30345 |
| 2012/0278263 A1* | 11/2012 | Borthwick | G06F 17/30303 706/12 |
| 2014/0279752 A1 | 9/2014 | Milana et al. | |
| 2014/0279815 A1 | 9/2014 | Wang et al. | |
| 2016/0294630 A1* | 10/2016 | Verma | H04L 41/12 |

OTHER PUBLICATIONS

Applying a hybrid model of neural network and decision tree classifier for predicting university admission Simon Fong; Yain-Whar Si; Robert P. Biuk-Aghai 2009 7th International Conference on Information, Communications and Signal Processing (ICICS) Year: 2009 pp. 1-5, DOI: 10.1109/ICICS.2009.5397665 IEEE Conference Publications.*

Application of Data Mining in Classification Analysis of Safety Accidents Based on Alternate Covering Neural Network Zhiming Qu 2009 International Conference on Innovation Management Year: 2009 pp. 47-50, DOI: 10.1109/ICIM.2009.18 IEEE Conference Publications.*

Credit Scoring Model Based on the Decision Tree and the Simulated Annealing Algorithm Yi Jiang 2009 WRI World Congress on Computer Science and Information Engineering Year: 2009, vol. 4 pp. 18-22, DOI: 10.1109/CSIE.2009.481 IEEE Conference Publications.*

International Patent Application No. PCT/US2015/058403, International Search Report and Written Opinion, mailed Jan. 11, 2016, 11 pages.

Zhao et al., "Comparison of decision tree methods for finding active objects" National Astronomical Observatories, CAS 20A Bejing China (2007) 10 pages.

Freund et al., "The alternating decision tree learning algorithm" AT&T Labs, NJ USA (2004), 10 pages.

Pfahringer et al., "Optimizing the Induction of Alternating Decision Trees" University of Waikato, New Zealand, (2001) 11 pages.

* cited by examiner

GENERATING ACCURATE REASON CODES WITH COMPLEX NON-LINEAR MODELING AND NEURAL NETWORKS

CROSS-REFERENCE TO RELATED APPLICATIONS

The present disclosure is a continuation of and claims priority to International Patent Application No. PCT/US2015/058403, titled "Generating Accurate Reason Codes with Complex Non-Linear Modeling and Neural Networks" and filed Oct. 30, 2015, which claims the benefit of priority under 35 U.S.C. §119(e) to U.S. Provisional Patent Application No. 62/072,999 filed Oct. 30, 2014, the entirety of both of which are incorporated herein by reference.

SUMMARY

This disclosure describes a computer system that computes a score for a received data exchange and, in accordance with a neural network and input variables determined by received current exchange and history data, the computed score indicates a condition suitable for a denial. A set of attribution scores are computed using an Alternating Decision Tree model in response to a computed score that is greater than a predetermined score threshold value for the denial. The computed score is provided to an assessment unit and, if the computed score indicates a condition suitable for the denial and if attribution scores are computed, then a predetermined number of input variable categories from a rank-ordered list of input variable categories is also provided to the assessment unit of the computer system.

The disclosure further describes a computer system comprising a processor and a non-transitory computer-readable storage medium that includes instructions that are configured to be executed by the processor such that, when executed, the instructions cause the computer system to perform operations including:
receiving data in connection with a data exchange received at a system relating to a record associated with a record owner;
retrieving history data from a data storage, wherein the history data relates to a history of the record associated with the record owner;
determining a set of input variables in response to the received data and the retrieved history data;
computing a score in connection with the record to which the received data relates, in accordance with a neural network and the determined input variables, wherein the computed score provides an indication of the record being in a compromised condition;
computing a set of attribution scores using an Alternating Decision Tree model, in response to a computed score that is greater than a predetermined score threshold value, in accordance with the input variables;
producing an Alternating Decision Tree score that corresponds to the score generated by the neural network, wherein the set of attribution scores comprises a rank-ordered list of the input variables that contribute to the computed set of attribution scores;
when the attribution scores are computed, providing a predetermined number of input variable categories from the rank-ordered list of input variable categories to an assessment unit of the computer system;
performing rules decisioning at the assessment unit in response to the computed score;
determining whether the computed score is greater than the predetermined score threshold value;
based upon determining that the computed score is greater than the predetermined score threshold value, providing a predetermined number of the input variable categories to the assessment unit;
determining a suggested action based on the performed rules decisioning; and
outputting information for the determined suggested action based on the performed rules decisioning.

The disclosure further provides a computer system, wherein the Alternating Decision Tree model comprises a complex non-linear assessment model.

The disclosure further provides a computer system, wherein the predetermined input variable categories of input variables comprise reason codes that identify the input variables that contributed to the computed set of attribution scores.

The disclosure further provides a computer system wherein the rules decisioning comprises mapping the input variables onto the input variable categories.

The disclosure further provides a computer system wherein the determined suggested action comprises transmitting approval information for the received data, in response to a computed score that is below a predetermined threshold value.

The disclosure further provides a computer system wherein the determined suggested action comprises transmitting denial information for the received data, and providing the predetermined number of input variable categories from the rank-ordered list of input variable categories, in response to a computed score that is greater than or equal to a predetermined threshold value.

The disclosure further provides a computer system wherein the Alternating Decision Tree model is generated based on input variables from which the complex non-linear assessment model is used to compute the score.

The disclosure further provides a computer system wherein the Alternating Decision Tree model is utilized after a confirmation and validation operation in which the scores generated by the Alternating Decision Tree model are substantially the same as scores generated by the complex non-linear assessment model for an equal set of input variable values.

The disclosure further provides a computer system wherein the performed operations further comprise providing the suggested action to a transaction processing system.

The disclosure further provides a method of operating a computer system, the method comprising: receiving data in connection with a data exchange received at a system relating to a record associated with a record owner; retrieving history data from a data storage, wherein the history data relates to a transaction history of the record associated with the record owner; determining a set of input variables in response to the received data and the retrieved history data; computing a score in connection with the record to which the received data relates, in accordance with a complex non-linear assessment model and the determined input variables, wherein the computed score indicates a risk of the record being in a compromised condition; computing a set of attribution scores using an Alternating Decision Tree model, in response to a computed score that is greater than a predetermined score threshold value, in accordance with the input variables, and producing an Alternating Decision Tree score that corresponds to the score generated by the complex non-linear assessment model, wherein the set of attribution scores comprises a rank-ordered list of the input variables that contribute to the computed set of attribution scores; when the attribution scores are computed, providing a predetermined number of input variable categories from the rank-ordered list of input variable categories to an assessment unit of the computer system; performing rules decisioning at the assessment unit in response to the computed score; determining whether the computed risk score is greater than the predetermined score threshold value; based upon determining that the computed score was greater than the predetermined score threshold value, providing a predetermined number of the input variable categories to the assessment unit; and determining a suggested action based on the performed rules decisioning.

The disclosure further describes a computer system comprising a processor and a non-transitory computer-readable storage medium that includes instructions that are configured to be executed by the processor such that, when executed, the instructions cause the computer system to perform operations including:

receiving data in connection with a data exchange received at a system relating to a record associated with a record owner;

retrieving history data from a data storage, wherein the history data relates to a transaction history of the record associated with the record owner;

determining a set of input variables in response to the received data and the retrieved history data;

computing a score in connection with the record to which the received data relates, in accordance with a neural network and the determined input variables, wherein the computed score provides an indication of the record being in a compromised condition;

computing a set of attribution scores using an Alternating Decision Tree model, in response to a computed score that is greater than a predetermined score threshold value, in accordance with the input variables;

producing an Alternating Decision Tree score that corresponds to the score generated by the neural network, wherein the set of attribution scores comprises a rank-ordered list of the input variables that contribute to the computed set of attribution scores;

when the attribution scores are computed, providing a predetermined number of input variable categories from the rank-ordered list of input variable categories to an assessment unit of the computer system;

performing rules decisioning at the risk assessment unit in response to the computed score;

determining whether the computed score is greater than the predetermined score threshold value;

based upon determining that the computed score was greater than the predetermined score threshold value, providing a predetermined number of the input variable categories to the assessment unit;

determining a suggested action based on the performed rules decisioning; and outputting information for the determined suggested action based on the performed rules decisioning.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

The present disclosure is described in conjunction with the appended figures.

Figure 1:
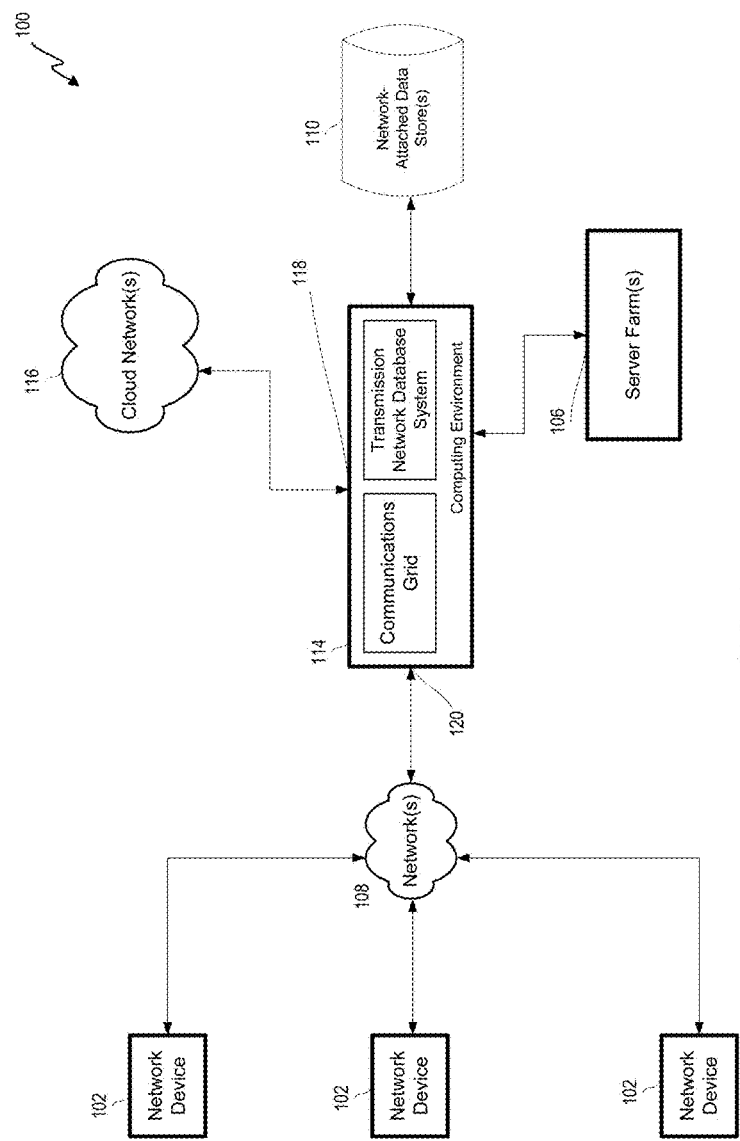
FIG. 1 illustrates a block diagram that provides an illustration of the hardware components of a computing system, according to some embodiments of the present technology.

In the appended figures, similar components and/or features can have the same reference label. Further, various components of the same type can be distinguished by following the reference label by a dash and a second label that distinguishes among the similar components. If only the first reference label is use in the specification, the description is applicable to any one of the similar components having the same first reference label irrespective of the second reference label.

DETAILED DESCRIPTION

In the following description, for the purposes of explanation, specific details are set forth in order to provide a thorough understanding of embodiments of the technology. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the technology as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional operations not included in a figure. A process may correspond to a method, a function, a procedure, a subroutine, a subprogram, etc. When a process corresponds to a function, its termination can correspond to a return of the function to the calling function or the main function.

Systems depicted in some of the figures may be provided in various configurations. In some embodiments, the systems may be configured as a distributed system where one or more components of the system are distributed across one or more networks in a cloud computing system.

This application discloses a technique for computing, in real time, a risk score for a received transaction of a customer account. In accordance with a non-linear risk assessment model and input variables determined by the received transaction and history data, the computed risk score indicates a risk of the customer account being in a compromised condition. In addition, an attribution score is computed in response to a computed risk score that is greater than a predetermined risk score threshold value, in accordance with the input variables provided to an Alternating Decision Tree model that corresponds to the non-linear risk assessment model. Also computed is a rank-ordered list of predetermined input variable categories that comprise input variables that contribute to the computed attribution score.

The computed risk score is provided to a risk assessment unit of the risk assessment computer system, and, if the attribution score is computed, a predetermined number of input variable categories from the rank-ordered list of input variable categories is also provided to the risk assessment unit of the risk assessment computer system.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
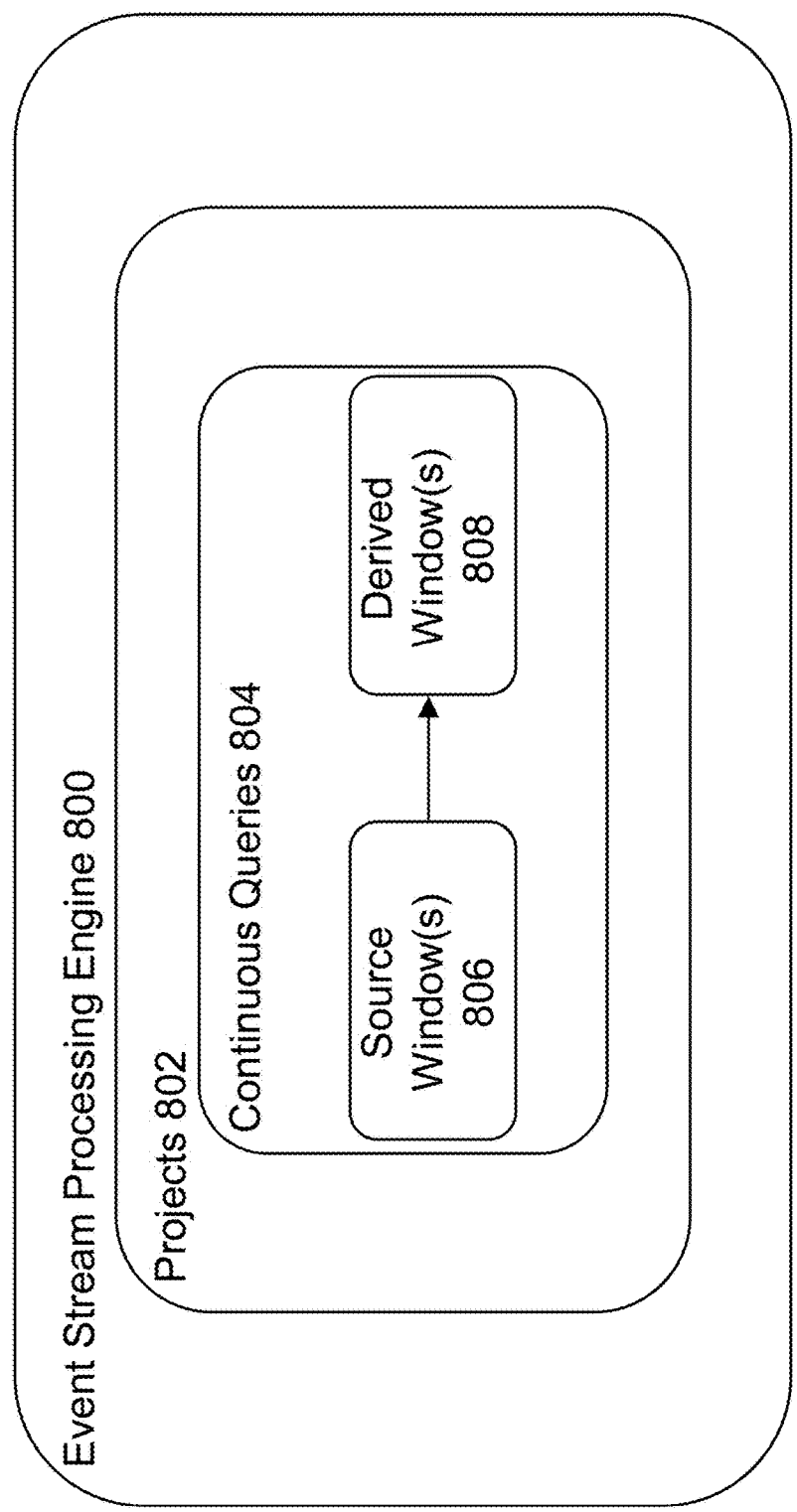
FIG. 8 illustrates a block diagram including components of an Event Stream Processing Engine (ESPE), according to embodiments of the present technology.
Figure 9:
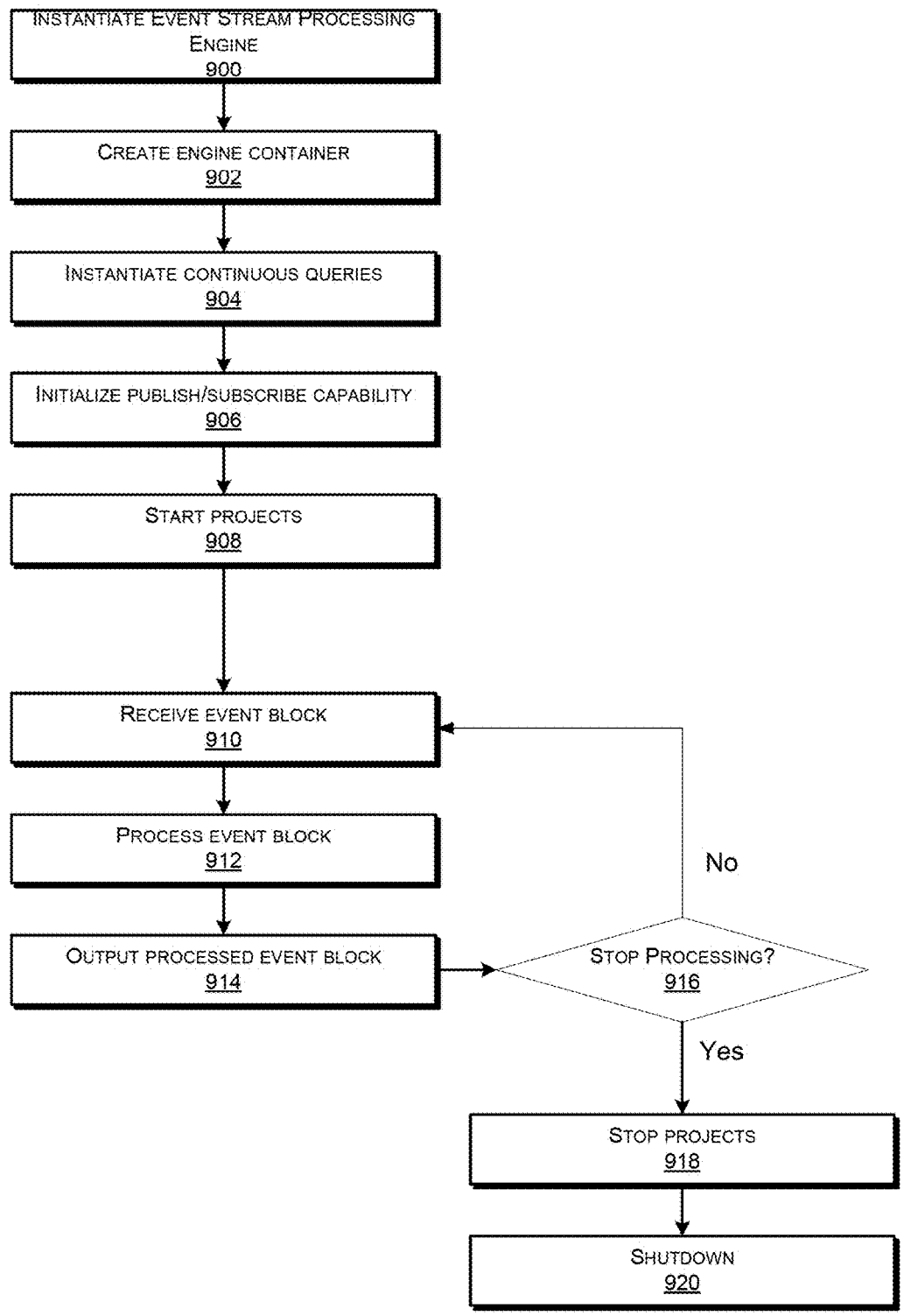
FIG. 9 illustrates a flow chart showing an example process including operations performed by an event stream processing engine, according to some embodiments of the present technology.
Figure 10:
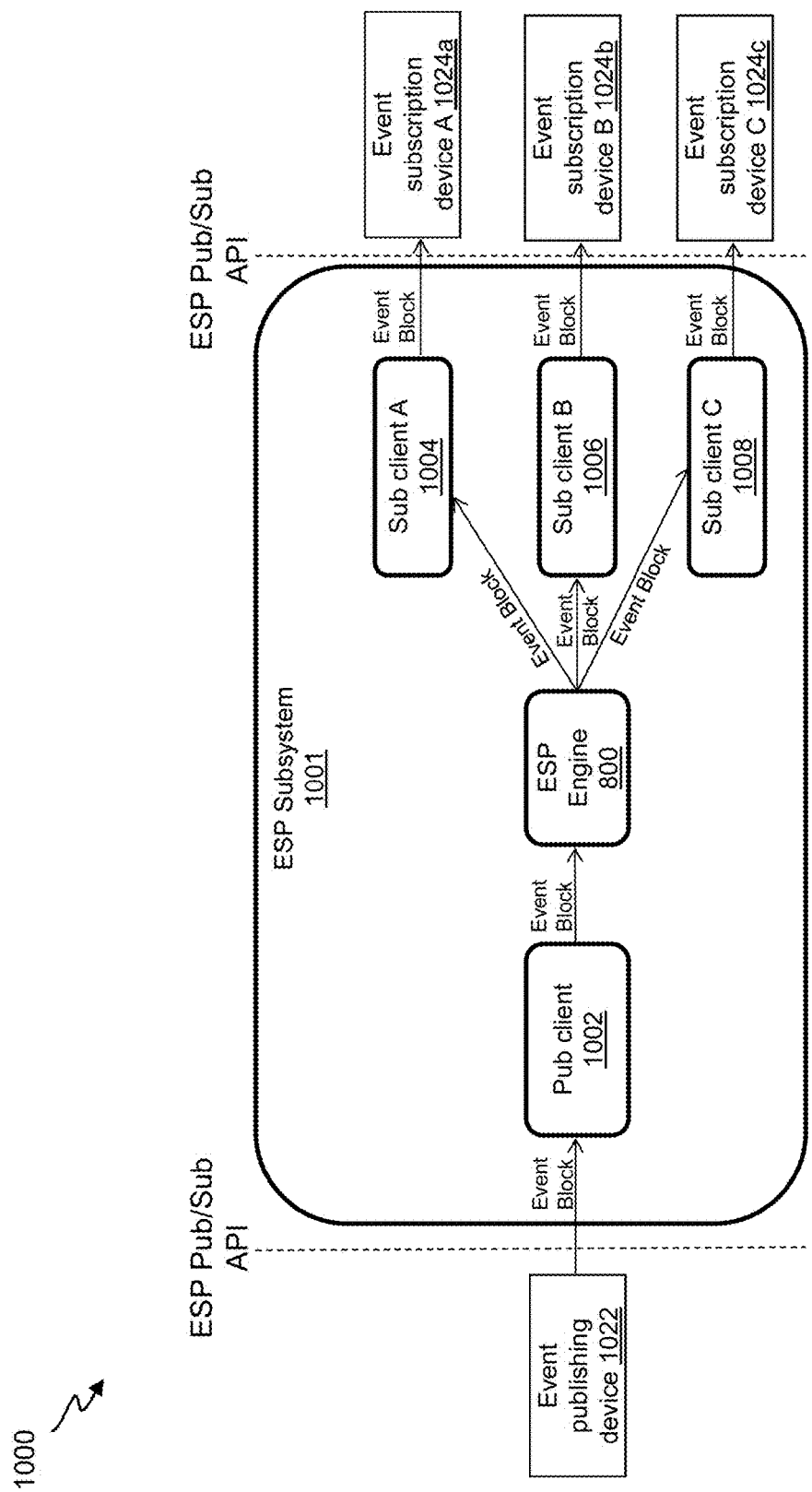
FIG. 10 illustrates an ESP system interfacing between a publishing device and multiple event subscribing devices, according to embodiments of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices, and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may comprise one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between a device and connection management system 150, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
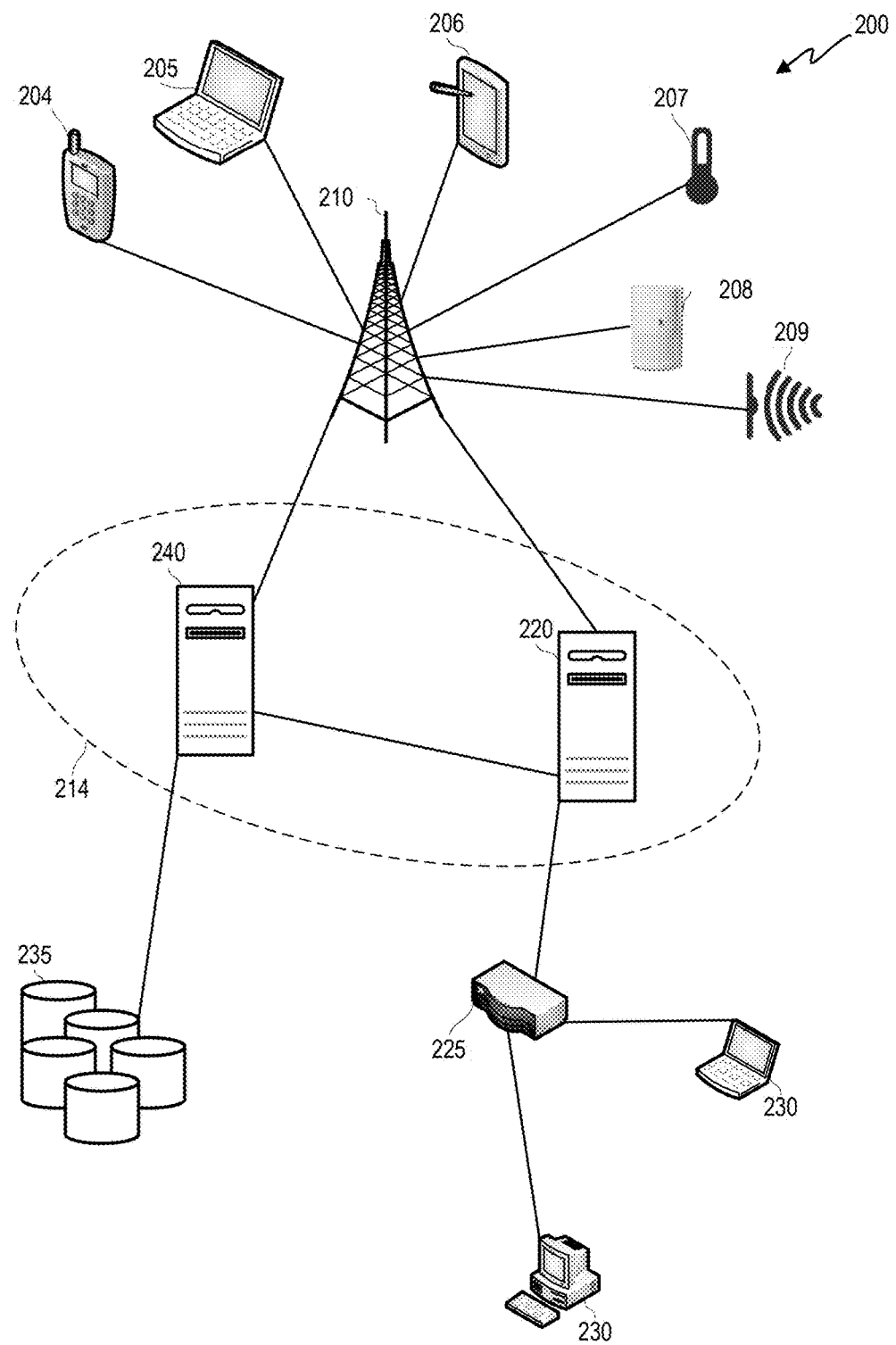
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
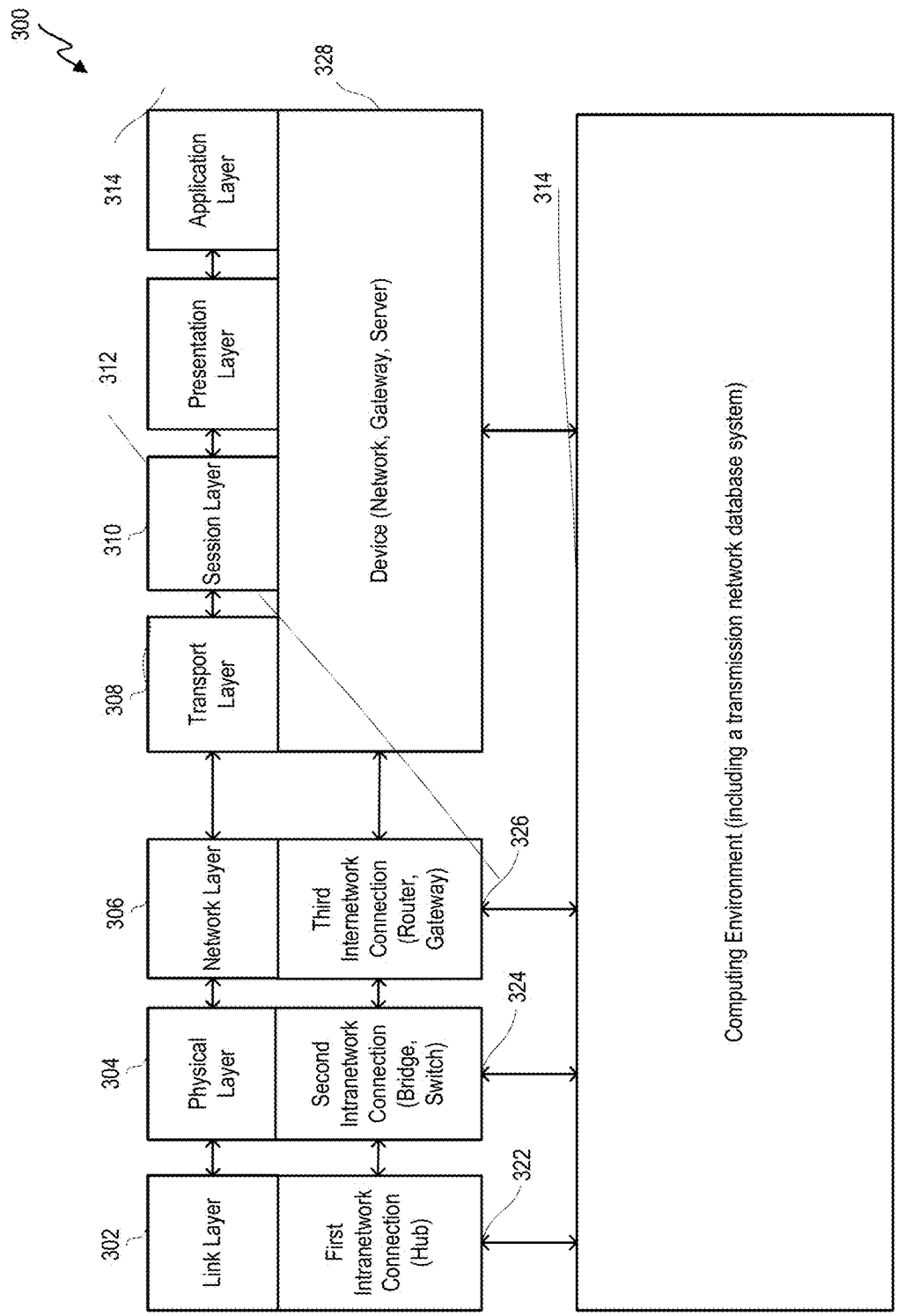
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 302-314. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 302. Physical layer 302 represents physical communication, and can define parameters of that physical communication. For example, such physical communication may come in the form of electrical, optical, or electromagnetic signals. Physical layer 302 also defines protocols that may control communications within a data transmission network.

Link layer 304 defines links and mechanisms used to transmit (i.e., move) data across a network. The link layer manages node-to-node communications, such as within a grid computing environment. Link layer 304 can detect and correct errors (e.g., transmission errors in the physical layer 302). Link layer 304 can also include a media access control (MAC) layer and logical link control (LLC) layer.

Network layer 306 defines the protocol for routing within a network. In other words, the network layer coordinates transferring data across nodes in a same network (e.g., such as a grid computing environment). Network layer 306 can also define the processes used to structure local addressing within the network.

Transport layer 308 can manage the transmission of data and the quality of the transmission and/or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it.

Session layer 310 can establish, maintain, and manage communication connections between devices on a network. In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt and/or format data based on data types known to be accepted by an application or network layer.

Application layer 314 interacts directly with software applications and end users, and manages communications between them. Application layer 314 can identify destinations, local resource states or availability and/or communication content or formatting using the applications.

Intra-network connection components 322 and 324 are shown to operate in lower levels, such as physical layer 302 and link layer 304, respectively. For example, a hub can operate in the physical layer, a switch can operate in the physical layer, and a router can operate in the network layer. Inter-network connection components 326 and 328 are shown to operate on higher levels, such as layers 306-314. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
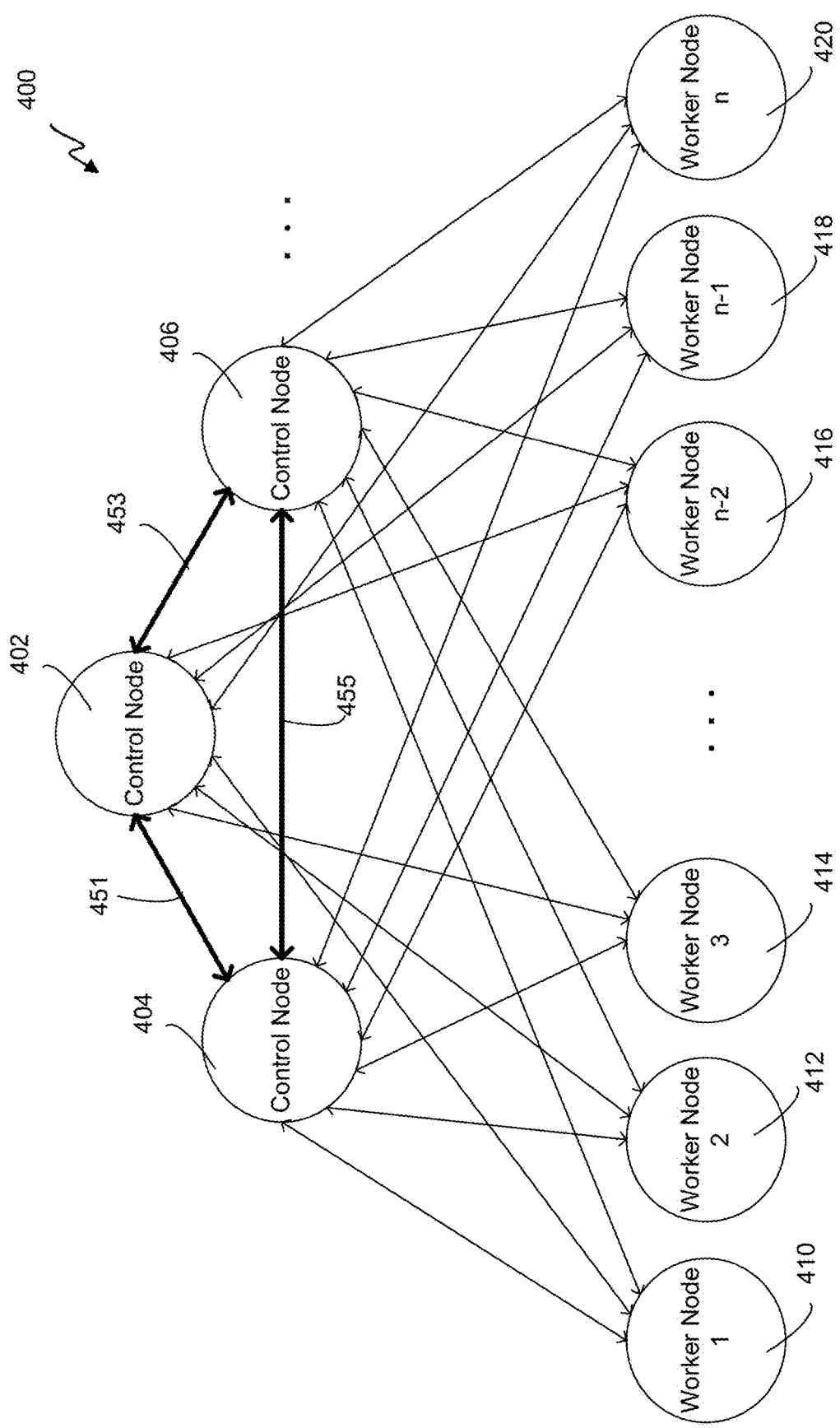
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be receive or stored by a machine other than a control node (e.g., a Hadoop data node).

Control nodes may maintain knowledge of the status of the nodes in the grid (i.e., grid status information), accept work requests from clients, subdivide the work across worker nodes, coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes). The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
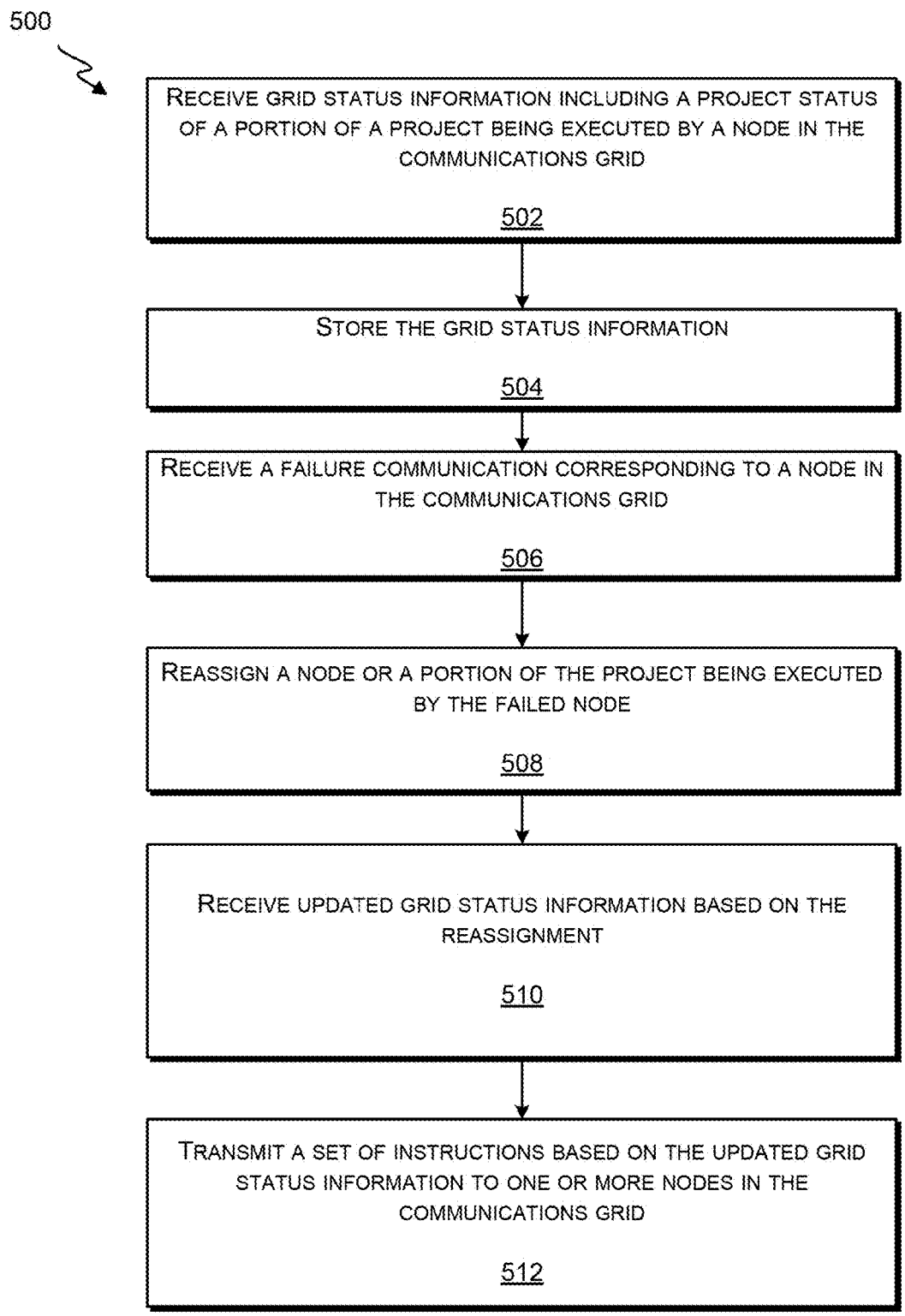
FIG. 5 illustrates a flow chart showing an example process for adjusting a communications grid or a work project in a communications grid after a failure of a node, according to some embodiments of the present technology.

FIG. 5 illustrates a flow chart showing an example process for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
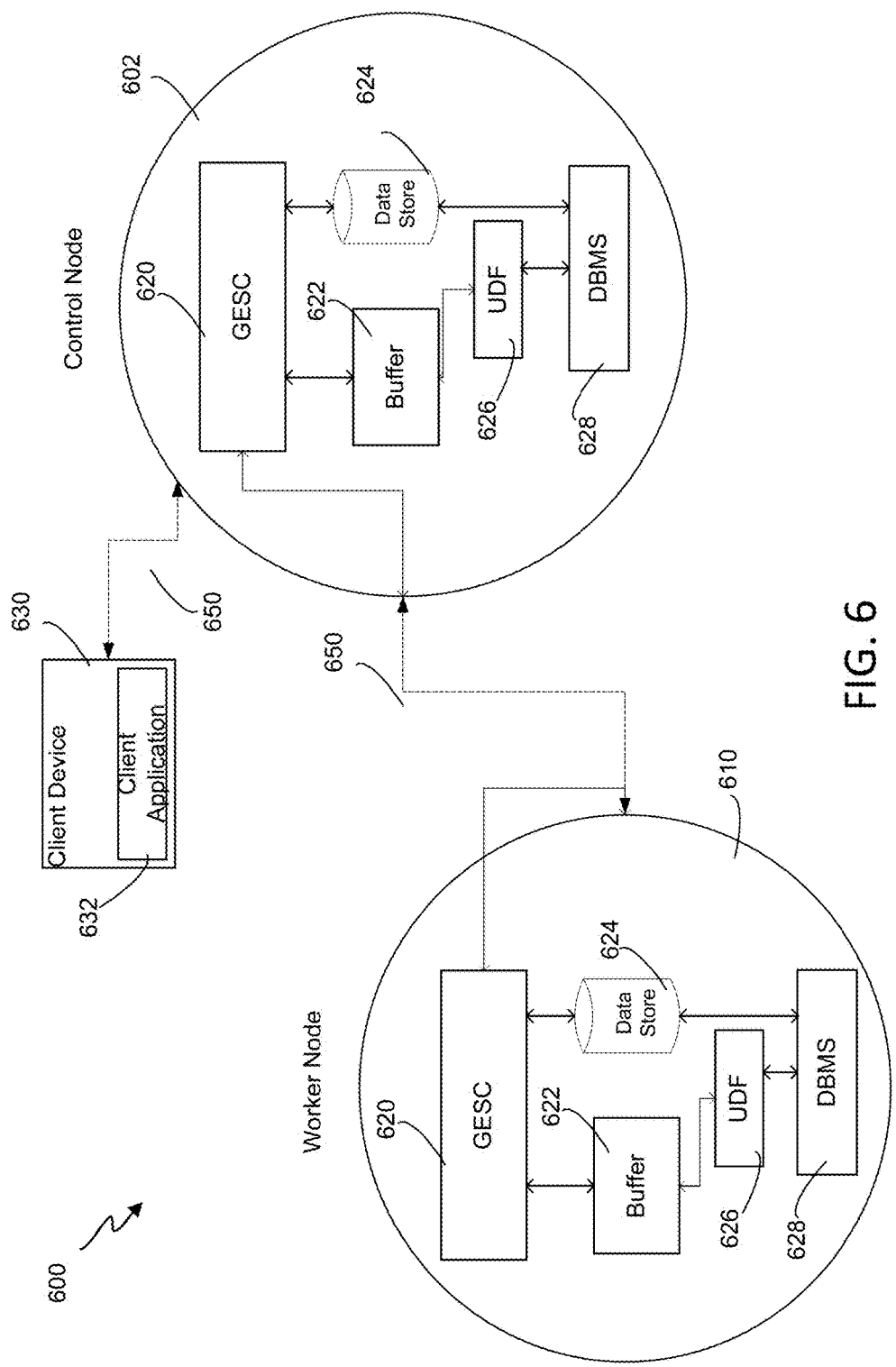
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650.

Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 comprise multi-core data processors. Each node 602 and 610 includes a grid-enabled software component (GESC) 620 that executes on the data processor associated with that node and interfaces with buffer memory 622 also associated with that node. Each node 602 and 610 includes a database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. In certain embodiments, however, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DMBS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client deice 630. More specifically, control node 602 may communicate with client application 632 hosted by the client device 630 to receive queries and to respond to those queries after processing large amounts of data.

DMBS 628 may control the creation, maintenance, and use of database or data structure (not shown) within a nodes 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
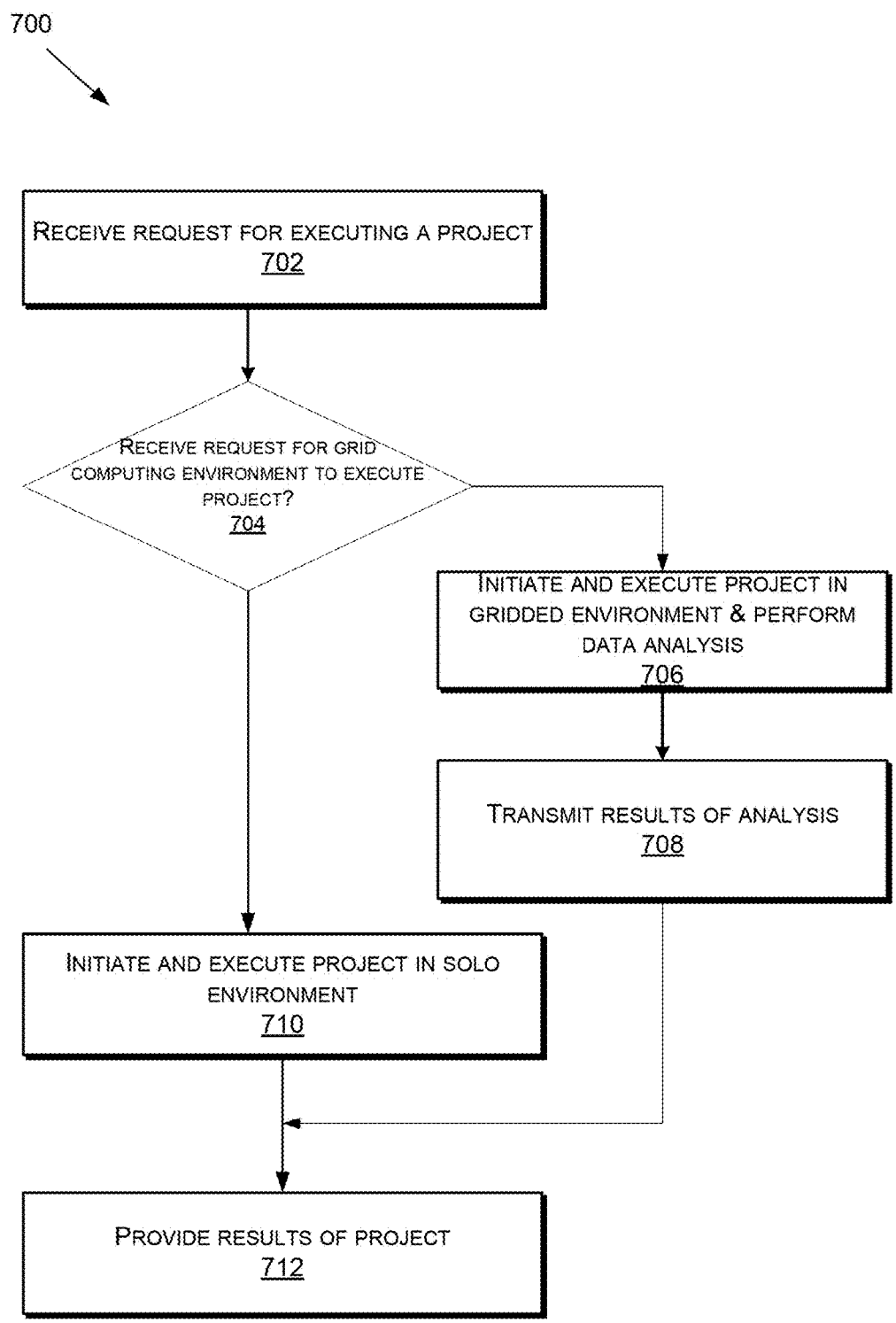
FIG. 7 illustrates a flow chart showing an example process for executing a data analysis or processing project, according to some embodiments of the present technology.

FIG. 7 illustrates a flow chart showing an example method for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. "Upsert" opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams.

More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024a-c, according to embodiments of the present technology. ESP system 1000 may include ESP device or subsystem 1001, event publishing device 1022, an event subscribing device A 1024a, an event subscribing device B 1024b, and an event subscribing device C 1024c. Input event streams are output to ESP device 1001 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024a, event subscribing device B 1024b, and event subscribing device C 1024c. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024a, event subscribing device B 1024b, and event subscribing device C 1024c, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024a, event subscribing device B 1024b, and event subscribing device C 1024c.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 800 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024a using the publish/subscribe API. Subscribing client B 1006 may be started by an event subscription application B executing at event subscribing device B 1024b using the publish/subscribe API. Subscribing client C 1008 may be started by an event subscription application C executing at event subscribing device C 1024c using the publish/subscribe API.

An event block object containing one or more event objects is injected into a source window of the one or more source windows 806 from an instance of an event publishing application on event publishing device 1022. The event block object may generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 806, and subscribing client C 808 and to event subscription device A 1024a, event subscription device B 1024b, and event subscription device C 1024c. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024a-c. For example, subscribing client A 804, subscribing client B 806, and subscribing client C 808 may send the received event block object to event subscription device A 1024*a*, event subscription device B 1024*b*, and event subscription device C 1024*c*, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shut down.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the Internet of Things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

This disclosure relates to data exchanges, such as transactions, between two parties with respect to an account. Each transaction is scored to determine a likelihood of the account being in a high risk condition, such as being in a compromised or fraudulent condition. Multiple transactions may relate to a single account. As used herein, "record" refers to data relating to one or more transactions or exchanges for one or more accounts. The records comprising accounts and/or exchanges are being assessed for risk (e.g., fraud or credit risk). The accounts typically relate to a credit or debit card, or electronic equivalent, for which the customer is obligated to make payment. A customer may have multiple accounts, but each transaction (data exchange) will relate to only one single account, and the customer historical account data discussed below relates to only the account associated with the transaction. Typical models for risk utilize highly complex non-linear models, such as neural networks, to model the assessment of risk and determine a valuation or score that measures the risk of fraud or credit risk, indicating a compromised account. Such models are utilized to obtain the most accurate detection possible and minimize losses as much as possible. But when such complex models are used, it may become difficult to decompose the risk score back to the input variables that contributed most to a score that was sufficiently high to indicate undue risk. Some typical means to determine the input variables that contributed to a high risk score may include utilizing a linear model that is relatively easy to explain, such as Linear Regression or Logistic Regression, run in parallel to the more complex non-linear model, where the decision score comes from the complex model and the input variables that comprise contributors to the decision score are easily extracted from the linear model. Such techniques, however, may not be optimal in the cases where the complex non-linear model performs much better than the simple linear model, which is what normally happens in processing for risk assessment.

It is generally inaccurate to try to explain a high risk score that is generated from the complex model by listing the contributing factors to the corresponding score in the simple linear model, when both models (and their scores) have a relatively great difference in performance. Other typical approaches may utilize training models on the input variables, or groups of input variables, trying to predict the already-generated score by the complex non-linear model. The problem with this approach is that there is a decoupling of the model target from the original complex model purpose (to predict high likelihood of fraud/default), and thus variables that drive the score up in the complex model may not be necessarily the ones that explain the high score in the second model. In this regard, a new approach is disclosed herein for generating accurate reason codes that explain the high fraud/credit risk scores in real time. This approach is performed by training a highly complex non-linear model to detect risk via a model referred to as an "Alternating Decision Tree" (ADT) model. This model can be run in parallel to another complex non-linear model such as a neural network, or it can be the main fraud/credit risk model itself, since the ADT model typically comes close in performance to a neural network. In real time, as a transaction gets scored for the likelihood of risk, the disclosed ADT approach generates and rank-orders accordingly up to a predetermined number of reason codes associated with the risk score.

The ADT model is a technique that works by collecting evidence for each input variable used as a node split as the decision tree is traversed from the root to the leaves. Unlike conventional decision trees that do not assign any prediction until the leaves are reached, the alternating decision tree model computes an intermediate prediction value at each variable split node, indicating the contribution of that variable to the overall score up to that point. Also, unlike conventional decision trees, in this technique, multiple paths can be traversed in parallel, with different variables or the same variables, but with different split criteria appearing in each path. This architecture is similar to an ensemble of trees but has the added benefit of being a compact representation into one.

Thus, the disclosed techniques for generating accurate reason codes for risk assessment and management provide advantageous features, such as:

1. In real time, a highly non-linear score can be created along with reason codes accurately attributing the contribution to high scores of input model variables or groups of input model variables. This technique can be applied to the area of risk management, where high scores typically prompt some sort of preventative action where that action is oftentimes guided by the information provided by the reason codes.
2. A pre-trained, highly complex non-linear model can be used to generate reason codes that explain high (risky) scores. The architecture of the tree obtained in training offline is used to extract reason codes and scores indicating the likelihood of risk. This model can be trained in parallel to another complex non-linear model such as a neural network, or it can be the main risk model itself, since it typically comes close in performance to a neural network. In real time, as a transaction gets scored for the likelihood of risk by some model, the disclosed alternating decision tree technique can generate and rank-order accordingly up to a certain number of reason codes associated with the score.
3. The disclosed technique generally works by collecting evidence for each input variable used as a node split as the tree is traversed from the root to the leaves. This architecture is similar to an ensemble of trees but has the added benefit of being a compact representation into one.
4. Another benefit of the alternating decision tree technique over other approaches is that it does internal variable selection and would discard some weak input variables from consideration for the score and reason codes. It also can deal with input variables that are both numeric and discrete and may have missing values. No pre-processing of the input variables in needed, unlike in other function-creating techniques such as Linear/Logistic Regression or Neural Network. The oftentimes needed pre-processing in the latter approaches is another reason why extracting reason codes with them may be inaccurate.
5. The alternating decision tree architecture can be used to extract accurate reason codes that explain the high/risky scores in a risk management system, which thus helps the appropriate actions to be taken. In addition, episode triggering code that is dynamically derived from the rules table during run time preprocessing can be provided in conjunction with system operation. Rules can be added or modified by updates to a dataset without changes to the production code for episode triggering.

The process for generating reason codes in accordance with this disclosure may be understood with reference to operations that comprise the following:

(1) For each input variable, all paths in the tree are traversed down, where the input variable is used as a splitting node and the prediction values associated with each splitting node are added up.
(2) After (1) has been performed for all input variables, a real value associated with each variable is obtained, where the more positive the value the higher the contribution of the individual input variable to the model score being high.
(3) If the number of variables associated with the same reason, e.g., what would be highly correlated variables, is high, the variables can be mapped to the same reason group code and their values can be added.
(4) In the end, a real value associated with each reason code is obtained that can be rank-ordered, and the top ones can be presented to explain variables contributing to any high scores.

It should be noted that, if multiple variables are referring to the same reason code group and are typically correlated, using the above-mentioned alternative approach of a simple linear method of linear or logistic regression in place of a more complex non-linear model would likely be undesirable, due to the possibility of coefficients (i.e., input variable values) pointing in different directions with respect to contributors to a score, and/or some coefficients (input variable values) being relatively insignificant. If linear or logistic regression were used, any extreme input variable values or coefficients could cause certain variables to be dominating in the reason codes.

The system illustrated and described herein includes a computer-implemented risk model that generates a risk score. That risk model can be an Alternating Decision Tree (ADT) model, but is typically another more complex, highly non-linear model such a Neural Network. If the risk model is not an ADT model, then a risk assessment operation is performed on an ADT model in parallel as the more complex risk model is performed, using the same input variables to the ADT as the input variables that go into the risk model operation. The ADT model is then used to generate up to a predetermined number of reason codes that explain the contribution of a predetermined number of the input variables (or variable groups) to the risk score produced by the risk model. As described further below, multiple input variables may be categorized into variable groups according to similar, common variable features among the members of a variable group.

Figure 11:
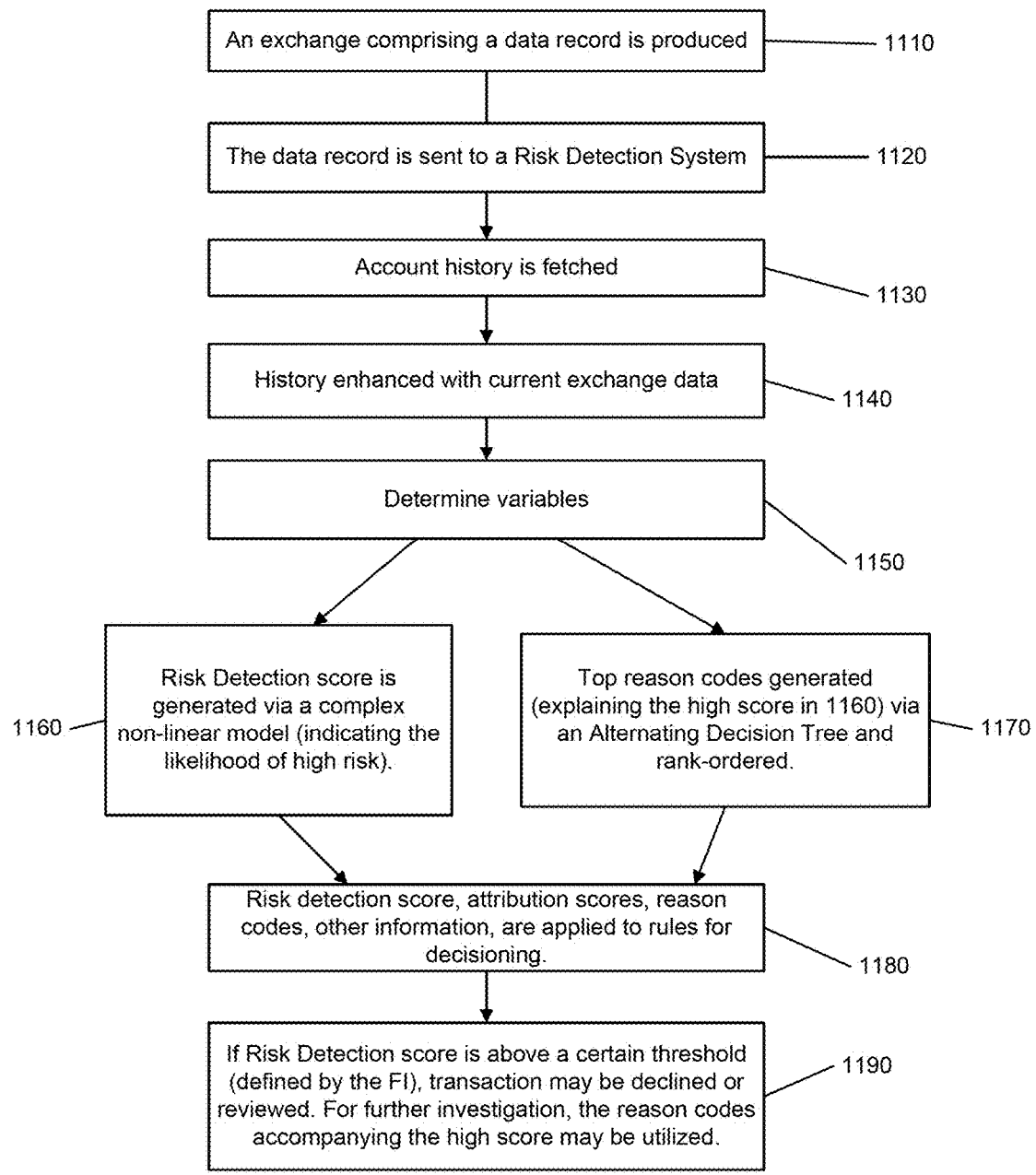
FIG. 11 illustrates an example of a flow diagram for assessment of risk for transactions involving a customer account, in accordance with the disclosure herein.

The outcome of the ADT model may be referred to as "attribution scores" comprising a score for each input variable and/or input variable group received for computing risk. If desired, it is not necessary that the attribution scores are computed for each and every transaction using the ADT model, rather, there may optionally be a predetermined, threshold value of the risk score computed by the complex, highly non-linear model, above which the ADT model is used to determine reason codes using the same input variables provided to the complex, highly non-linear model, such that the attribution scores of the ADT model are not otherwise computed. Such threshold values may be determined by those skilled in the art, in view of this disclosure, in accordance with desired system performance. The disclosed ADT technique of the drawings does not require predetermined thresholds with regard to the ADT model attribution scores FIG. 11 illustrates the general flow chart of scoring a data record, relating to an exchange between two parties, for risk. At the box 1110, an exchange comprising a data record is produced. At the box 1120, the data record is sent to a Risk Detection System. At box 1130, history of the account relating to the data record is fetched from a data store. The fetched history is enhanced with data relating to the current exchange at the box 1140. At the box 1150, variables are determined, such as input variables for the complex, highly non-linear model. Some of the variables may be calculated by the system. Next, two parallel computing paths may be implemented to generate a risk score, using the complex non-linear model (box 1160) and/or attribution scores, using the ADT model (box 1170). A higher risk score from the complex non-linear detection model noted in box 1160 indicates a higher degree of risk. Box 1170 includes a technique that derives the top reason codes rank-ordered to reflect their respective contribution to the high score produced in box 1160.

The procedure noted in box 1160 could be any highly predictive complex non-linear algorithm, such as a neural network, SVM, decision tree or ensemble of decision trees, or an alternating decision tree. The procedure noted in box 1170 is the Alternating Decision Tree as described herein. After the computation of box 1160 and 1170, the computed information is provided to the system at box 1180 for applying rules used in decisioning. At box 1190, if the Risk Detection score is above a certain threshold, the data exchange may be declined or reviewed for unacceptable risk. The reason codes determined by the ADT model may be utilized to explain the risk score and/or the decision to decline or review.

Figure 12:
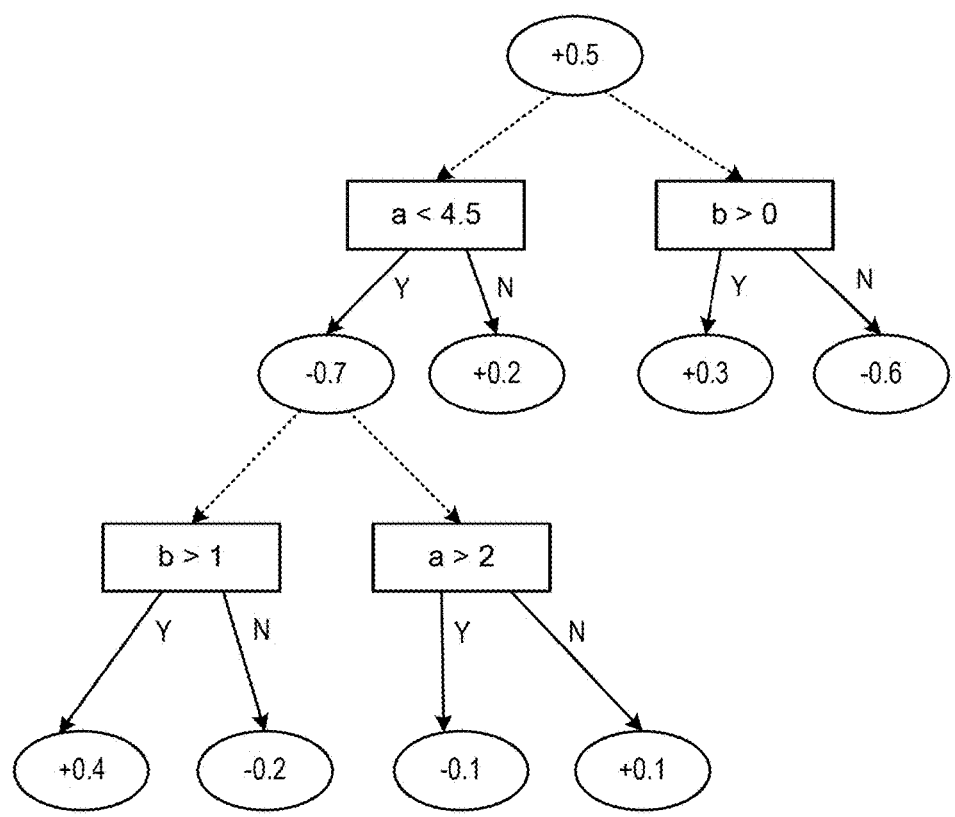
FIG. 12 illustrates an example of a portion of an Alternating Decision Tree such as used in conjunction with the system disclosed herein.

A portion of a simple, two-variable Alternating Decision Tree 1200 is depicted in FIG. 12. The depiction in FIG. 12 shows a root prediction value indicating the prior odds or the global risk rate. The root prediction value is added to all paths traversed and thus can be ignored for reason codes generation. After that, the drawing shows alternating layers of splitting/decision nodes and, associated with each node, intermediate prediction values. As the paths are traversed from the root to the leaves, values are accumulated for each variable used in a decision node. There are two outcomes:

(a) A score as comprised by the sum of all prediction values encountered during the traversal of the tree for a particular set of input variable values. This can be used as the model in box 1160 (FIG. 11) or can be discarded if another model is used.

(b) The score from (a) being broken down into contributions per each input variable, or variable group if a mapping to a variable group exists. These score components associated with each variable or variable group can be rank-ordered and the ones with the highest scores presented as reason codes for the high score from the box 1160.

For example, if the input variables had the following values: a=1 and b=2, then the reason codes for variables a and b will be computed by traversing all tree paths, evaluating the conditions at decision nodes, and accumulating the predictor values that are encountered for each node:

Var($a$)=−0.7+0.1=−0.6

Var($b$)=0.4+0.3=0.7

In FIG. 12, at the first node level, for a=1, the value at the node is "yes" (Y) for "a<4.5" for a value of −0.7; at the second node level, for a=1, the value at the node level is "no" (N) for "a>2" for a value of 0.1, giving a total of −0.7+0.1=−0.6 as the computed value. At the first node level, for b=2, the value at the node is "yes" (Y) for "b>0" for a value of 0.3; at the second node level, for b=2, the value at the node is "yes" (Y) for "b>1" for a value of 0.4, giving a total of 0.4+0.3=0.7 as the computed value.

If the tree were used to produce a score in addition, the score would be given as: root+Var(a)+Var(b)=0.5+−0.6+0.7=0.6 as the computed value. It should be apparent that, if a single reason code were extracted, indicating which variable (a or b) contributes most to the computed risk score being high, it would be variable b (which contributes 0.7 of the total 0.6 computed score value).

In a typical enterprise fraud or credit risk management system, there could be hundreds of variables used in the predictive model. Sometimes, a lot of derived variables can refer back to the same raw input data field. For example, there could be variables based on a current transaction amount that measures its ratio to the average transaction amount in the last 2 hours, 1 day, and 30 days. Although such derivative variables are expected to be highly correlated, they sometimes could be all predictive in a highly complex non-linear model. Thus, there may be a reason code that states: "Current transaction amount is high relative to recent spend behavior, thus indicating high risk". In this case, all three of the example variables mentioned would be mapped to the same reason code. In general, after individual variable contribution is computed using the Alternating Decision Tree, they could be mapped to a reason code group, where the additive property still applies. In the example mapping table below, variables a and b are both mapped to the same Reason Code 1001 (which has some meaning not shown here), and variable c is mapped to Reason Code 1002 (which has some meaning other than the one associated with 1001). The value by which Reason Code 1001 is compared and rank-ordered relative to other reason codes, is simply the sum of the individual variable contributions of its variables Var(a) and Var(b):

TABLE 1

Mapping from input variables to reason codes

| Input Var | Reason Code |
|---|---|
| a | 1001 |
| b | 1001 |
| c | 1002 |

For example, one reason code grouping might comprise mapping two related input variables to the same reason code grouping, and could involve a ratio of the current data exchange to an "average one-day exchange amount" and a ratio of the current data exchange to an "average one-week exchange amount". Because both variables relate to current data exchange to average exchange amount, both of the example variables could be mapped to one reason code group, a reason code group comprising ratio of current data exchange to average historical exchange amount.

Figure 13:
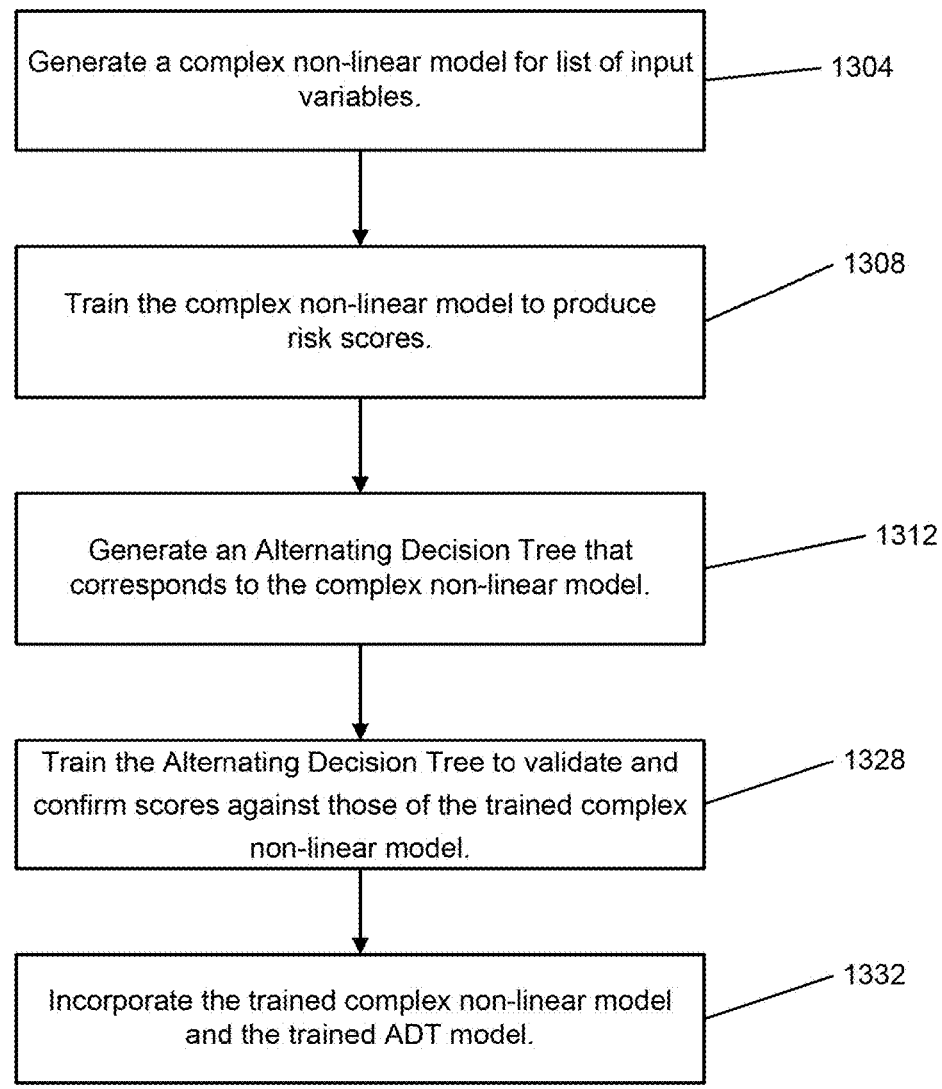
FIG. 13 illustrates an example of a flow diagram for assessment of risk using Alternating Decision Trees for transactions involving a customer account.

FIG. 13 illustrates an example of a flow diagram for configuring the Alternating Decision Tree using the same set of input variables as are provided to the complex non-linear model for assessment of data exchanges involving a customer account.

At the first operation, represented by the box 1304, a complex non-linear model for the list of input variables is generated. Such nonlinear models are typically generated as neural networks, which will be familiar to those skilled in the art. Those skilled in the art will recognize that the input variables may comprise a list of hundreds of variables, or even thousands of variables. Decisions about the nature, quality, and quantity of input variables will be determined by system administrators and designers who are participating in the configuring.

In the next operation, at the box 1308, the complex nonlinear model, such as a neural network, is trained to produce risk scores for use in processing data records for risk. Those skilled in the art will be familiar with the techniques for training complex non-linear data models, such as neural networks.

At the box 1312, an alternating decision tree model is generated that corresponds to the complex non-linear model generated at box 1304. The alternating decision tree model is selected, for the reasons described herein. In an example, the complex non-linear model may comprise a neural network.

At the next operation, box 1328, the alternating decision tree is trained to validate and confirm that the risk scores it generates are consistent with the risk scores generated by the complex nonlinear model. The operations comprising the box 1328 include a confirmation and validation operation in which the risk scores generated by the Alternating Decision Tree (ADT) model are confirmed and validated as being substantially the same as risk scores generated by the complex non-linear risk assessment model for an equal set of input variable values. For example, the risk scores by the ADT model may be deemed "substantially the same" as the risk scores by the complex non-linear model if the difference between the risk scores by each respective model is less than a predetermined difference threshold in accordance with system requirements.

At the box 1332, the data relating to the trained complex non-linear model is incorporated into a production version of the system, along with data relating to the trained alternating decision tree model.

Figure 14:
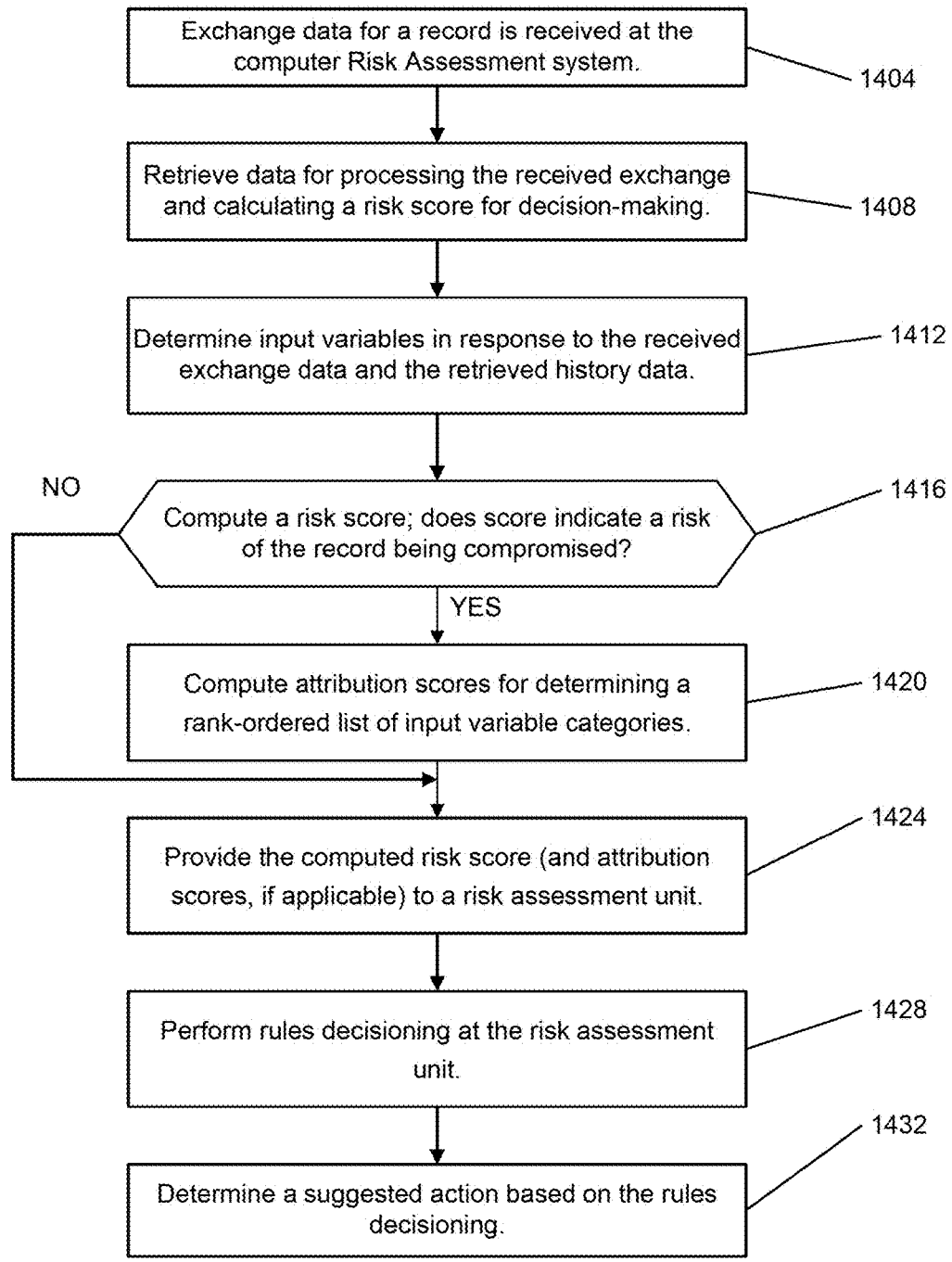
FIG. 14 illustrates an example of a flow diagram for configuring the Alternating Decision Tree using the non-linear model for assessment of transactions involving a customer account.

FIG. 14 illustrates a general flow chart of a data exchange that may be scored. In the first FIG. 14 operation, represented by the box 1404, transaction data for a data record account is received at the risk assessment system. The data of the exchange will typically be received from an entity in response to a user transaction, such as a purchase or a request for exchange authorization, or the like. The data may comprise, for example, data relating to a purchase exchange for which authorization to charge an account is requested.

In the next operation, at the box 1408, data for processing the received transaction and calculating a risk score for decision-making is retrieved from data storage. The data storage may be retrieved from storage of the system, or from storage elsewhere that is accessible to the system. The retrieved data may include customer identification data and purchase location data, based on the card account number and the merchant information that typically accompanies the request for authorization of the transaction. The retrieved data also includes risk variables such as risk values associated with the transaction location, transaction amount, time of day, goods or services, and the like. The retrieved data is selected according to decisions of the processing system administrators during configuration of the system. The selection of data to be retrieved includes decisions by the system administrators as to the risk variables that have been deemed important to authorization decision making. That is, the data to be retrieved by the system will be selected by authorized persons during system configuration, in accordance with the user needs for the environment in which the system is being implemented, because the data will be the set of data deemed useful by system administrators in authorization decision making, which data sets will be different for different systems, users, and environments.

At the box 1412 operation, input variable values are determined in response to the received data and the retrieved history data. The input variable values are typically within the data of the received exchange data. Such information may include, for example, identification of the customer and entity, purchase amount, location, time of day, goods or services, and the like.

Next, at the box 1416, a risk score is computed. The risk score is a score based on a complex non-linear data model, such as a neural network. Those skilled in the art will appreciate and understand the data models that are typically employed for calculating a risk score or other metrics of risk involved with transactions processing. The risk score computed at the box 1416 is based on the retrieved data and calculated data variables from the operation at box 1408 and 1412.

If the computed risk score indicates that the record is not likely compromised, a negative outcome at the box 1416, then processing continues at the box 1424. If the computed risk score indicates that the record might be compromised, or if it indicates that for another reason the exchange should be denied, then the operation proceeds to the box 1424. Thus, if there is no likelihood of risk detected, then the exchange is likely to be approved, and no attribution scores need be computed with the alternating decision tree.

At the box 1420, which is arrived at if the computer risk score is greater than a threshold value, then the attribution scores are computed. The attribution scores may then be mapped onto categories of the input variables, for determining a rank-ordered list of input variable categories. The attribution scores are computed using an alternating decision tree, as described herein.

At the box 1424, the computed risk score and the computed attribution score are provided to a risk assessment unit. In accordance with the processing of the box 1416, the risk assessment unit is provided with the computed risk score and the attribution scores, if the computed risk score indicates a risk of the customer record being compromised or if for some other reason the system computes values that indicate the exchange should be denied. The attribution scores otherwise are not provided, the attribution score computation process 1420 having been skipped for a "NO" response at the box 1416.

At the box 1428, rules decisioning is performed at the risk assessment unit. Such decision ending may comprise, for example, determining input variables that contributed most to the risk scores.

At the box 1432, a suggested action is determined, based on the rules decisioning. Such determinations may be made at the risk assessment unit in the interest of prompt response to the entity and informing the customer of any contributing variables to a denial of authorization.

Refinements to the data and operations of the system may be selected. For example, the retrieved data of box 1408 also possibly includes cardholder (i.e., account owner) behavior variables, which will typically be in the form of statistical variables, such as typical transaction location, average transaction amount, typical transaction time of day, average amount of goods or services charged, and the like. For example, the "typical transaction location" risk variables may comprise an indicator that compares typical postal codes or addresses or geographic information and determines if the present transaction location corresponds to a postal code or address or other geographic information that indicates a location that is unusually risky from the locations that the user normally frequents. In such an example, an "unusually risky" location is a location at which a determined location risk value (for loss or fraud) is greater than a threshold risk value set by the system implementation. The location-based risk variables as part of a risk determination for a user may include many such "typical transaction locations", such as locations near the user's residence, near a school, near a work location, and the like. Some other examples could comprise comparison of typical merchants, merchant category code, transaction amount bins, or times of day the user visits those merchants. The degree (e.g., magnitude) of departure from normal behavior may be selected by the processing system according to experience of the degree-of-departure value that corresponds to typically unacceptable risk. This degree-of-departure value for the data, and for the user's behavior, may be measured mathematically using a variety of measures known to those skilled in the art, such as mahalanabolis distance or a discriminant function analysis. The retrieved data is typically retrieved by the processing system from network data storage.

In the decision box 1416, the system determines if the score is above a predetermined threshold value. The threshold value is determined by system administrators during configuration of the system after considering the number of alerts per day the bank works on typically. That is, the threshold value will be different for different system implementations, depending on the number of alerts typically experienced by the bank, or entity, for which the system is implemented. Those skilled in the art will be able to determine an appropriate value for the threshold in view of their system experience and any experimental efforts. If the score is above the threshold value, an affirmative outcome at the decision box 1416, then the system processing proceeds to box 1420, where the system computes attribution scores, using the ADT model, for the received transaction and determining a rank-ordered list of input variable categories.

If the score is not above the predetermined threshold value, a negative outcome at the decision box 1416, the system forgoes computing the ADT attribution scores and determining the rank-ordered list of input variable categories. Instead, system operation proceeds directly to the box 1424. At the box 1424, the risk score alone, if the risk score indicates low risk of a compromised account, or the risk score and attribution scores from the ADT model, are provided to a risk assessment unit. That is, a score above the predetermined threshold indicates a transaction of greater than tolerable risk, in which case the ADT is executed and the attribution scores are computed, but if the score does not indicate too great a risk, then the ADT attribution scores at box 1420 are not computed. In that situation, the suggested action will not be determined in response to a risk transaction and the ADT model. It should be noted that the scoring check at the decision box 1416 is an optional operation; as an alternative, the attribution scores of the ADT model may be computed in parallel with the more complicated operation for the complex non-linear risk model for every received data exchange, rather than just for exchanges having computed risk scores above a predetermined threshold value.

As noted above, institutions have found that customers may become annoyed and irritated when their transactions are declined and they do not understand the reasoning behind those declined transactions. For example, if the customer's attempt to make a purchase at a coffee shop was declined, then the customer may be angry if the customer shops there every day. However, if the customer made an unusual purchase that is something outside of the customer's normal spending pattern, with the availability of reason codes that are efficiently and accurately generated using an ADT model, the institution would have an easier time explaining to the customer why the transaction was declined.

As noted above, some existing techniques use complex non-linear models to create risk scores that measure the likelihood that the account is currently compromised. In accordance with this disclosure, however, reason codes can be generated using an ADT technique that generates risk score outcomes in parallel to the more complex non-linear models, but with which a rank-ordered list of contributing input variables is more easily generated. The disclosed technique makes at least these two factors separate so that multiple factors can be used to control risk and the customer experience.

As noted above in conjunction with FIGS. 1-10, systems and methods according to some examples may include data transmissions conveyed via networks (e.g., local area network, wide area network, Internet, or combinations thereof, etc.), fiber optic medium, carrier waves, wireless networks, etc. for communication with one or more data processing devices. The data transmissions can carry any or all of the data disclosed herein that is provided to, or from, a device.

While this disclosure may contain many specifics, these should not be construed as limitations on the scope of what may be claimed, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be utilized. Moreover, the separation of various system components in the implementations described above should not be understood as requiring such separation in all implementations.

Some systems may use Hadoop®, an open-source framework for storing and analyzing big data in a distributed computing environment. Some systems may use cloud computing, which can enable ubiquitous, convenient, on-demand network access to a shared pool of configurable computing resources (e.g., networks, servers, storage, applications and services) that can be rapidly provisioned and released with minimal management effort or service provider interaction. Some grid systems may be implemented as a multi-node Hadoop® cluster, as understood by a person of skill in the art. Apache™ Hadoop® is an open-source software framework for distributed computing. Some systems may use the SAS® LASR™ Analytic Server in order to deliver statistical modeling and machine learning capabilities in a highly interactive programming environment, which may enable multiple users to concurrently manage data, transform variables, perform exploratory analysis, build and compare models and score. Some systems may use SAS In-Memory Statistics for Hadoop® to read big data once and analyze it several times by persisting it in-memory for the entire session.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situations where only the disjunctive meaning may apply.

The invention claimed is:

1. A computer system comprising:
   a processor; and
   a non-transitory computer-readable storage medium that includes instructions that are executable by the processor to cause the computer system to perform operations including:
      receiving data in connection with a data exchange, wherein the data relates to a record associated with a record owner;
      retrieving history data that relates to a history of the record associated with the record owner;
      determining input variables based on the data and the history data;
      computing a score in connection with the record, wherein the score is computed using a neural network and the input variables, and wherein the score indicates that the record is in a compromised condition;
      determining that the score is greater than a predetermined threshold score;
      computing a set of attribution scores when the score is determined to be greater than the predetermined threshold score, wherein the set of attribute scores are computed using an Alternating Decision Tree, and wherein the Alternating Decision Tree is trained using the input variables;
      producing an Alternating Decision Tree score that corresponds to the score generated by the neural network, wherein the set of attribution scores comprises a rank-ordered list of the input variables that contribute to the Alternating Decision Tree score;
      determining an input variable category, wherein the input variable category is determined using the input variables and the set of attribution scores;
      determining a suggestion action, wherein the suggested action is determined using the input variable category and the set of attribution scores; and
      outputting information associated with the suggested action.

2. The computer system of claim 1, wherein non-transitory computer-readable storage medium further includes instructions executable by the processor to cause the processor to train the neural network, wherein the neural network is trained to include a relationship between the input variables and the score.

3. The computer system of claim 1, wherein the input variable category comprises a reason code that identifies one or more input variables that contributed to the set of attribution scores.

4. The computer system of claim 1, wherein the non-transitory computer-readable storage medium further comprises instructions executable by the processor for causing the processor to categorize the input variables into the input variable category.

5. The computer system of claim 4, wherein the non-transitory computer-readable storage medium further comprises instructions executable by the processor for causing the processor to select the input variable category from among a plurality of input variable categories based on the set of attribution scores.

6. The computer system of claim 1, wherein the suggested action comprises transmitting approval information for the data.

7. The computer system of claim 1, wherein the suggested action comprises transmitting denial information that includes the input variable category, wherein the denial information is transmitted in response to the score being greater than or equal to another predetermined threshold score.

8. The computer system of claim 1, wherein non-transitory computer-readable storage medium further includes instructions executable by the processor to cause the processor to incorporate a trained version of the neural network and a trained version of the Alternating Decision Tree into a production version of a risk identification system.

9. The computer system of claim 1, wherein the Alternating Decision Tree is utilized after a validation operation in which scores generated by the Alternating Decision Tree based on a set of input variables are determined to be within a predefined tolerance range of scores generated by the neural network based on the same set of input variables.

10. The computer system of claim 1, wherein the Alternating Decision Tree includes a plurality of split nodes forming a plurality of paths that are traversable by the Alternating Decision Tree, each split node of the plurality of split nodes including a threshold value that separates at least two paths of the plurality of paths, each path of the at least two paths having a respective intermediate prediction value, wherein the Alternating Decision Tree is configured to traverse the plurality of paths based on the input variables to determine the attribution scores.

11. A computer-implemented method comprising:
receiving data in connection with a data exchange, wherein the data relates to a record associated with a record owner;
retrieving history data that relates to a history of the record associated with the record owner;
determining input variables based on the data and the history data;
computing a score in connection with the record, wherein the score is computed using a non-linear assessment model and the input variables, and wherein the score indicates that the record is in a compromised condition;
determining that the score is greater than a predetermined threshold score;
computing a set of attribution scores when the score is determined to be greater than the predetermined threshold score, wherein the set of attribute scores are computed using an Alternating Decision Tree;
producing an Alternating Decision Tree score that corresponds to the score generated by the non-linear assessment model, wherein the set of attribution scores comprises a rank-ordered list of the input variables that contribute to the Alternating Decision Tree score;
determining an input variable category, wherein the input variable category is determined using the input variables and the set of attribution scores;
determining a suggestion action, wherein the suggested action is determined using the input variable category and the set of attribution scores; and
outputting information associated with the suggested action.

12. The computer-implemented method of claim 11, wherein the non-linear assessment model includes a neural network.

13. The computer-implemented method of claim 11, wherein the input variable category comprises a reason code that identifies one or more input variables that contributed to the set of attribution scores.

14. The computer-implemented method of claim 11, further comprising categorizing the input variables into the input variable category.

15. The computer-implemented method of claim 14, further comprising selecting the input variable category from among a plurality of input variable categories based on the set of attribution scores.

16. The computer-implemented method of claim 11, wherein the suggested action comprises transmitting approval information for the data.

17. The computer-implemented method of claim 11, wherein the suggested action comprises transmitting denial information that includes the input variable category, wherein the denial information is transmitted in response to the score being greater than or equal to another predetermined threshold score.

18. The computer-implemented method of claim 11, wherein the Alternating Decision Tree is trained using the input variables.

19. The computer-implemented method of claim 11, further comprising utilizing the Alternating Decision Tree after performing a validation operation in which scores generated by the Alternating Decision Tree based on a set of input variables are determined to be within a predefined tolerance range of scores generated by the non-linear assessment model based on the same set of input variables.

20. The computer-implemented method of claim 11, further comprising providing the suggested action to a transaction processing system.

21. A non-transitory computer readable medium comprising instructions executable by a processor for causing the processor to perform operations including:
receiving data in connection with a data exchange, wherein the data relates to a record associated with a record owner;
retrieving history data that relates to a history of the record associated with the record owner;
determining input variables based on the data and the history data;
computing a score in connection with the record, wherein the score is computed using a non-linear assessment model and the input variables, and wherein the score indicates that the record is in a compromised condition;
determining that the score is greater than a predetermined threshold score;
computing a set of attribution scores when the score is determined to be greater than the predetermined threshold score, wherein the set of attribute scores are computed using an Alternating Decision Tree;
producing an Alternating Decision Tree score that corresponds to the score generated by the non-linear assessment model, wherein the set of attribution scores comprises a rank-ordered list of the input variables that contribute to the Alternating Decision Tree score;
determining an input variable category, wherein the input variable category is determined using the input variables and the set of attribution scores;
determining a suggestion action, wherein the suggested action is determined using the input variable category and the set of attribution scores; and
outputting information associated with the suggested action.

22. The non-transitory computer readable medium of claim 21, wherein the non-linear assessment model includes a neural network.

23. The non-transitory computer readable medium of claim 21, wherein the input variable category comprises a reason code that identifies one or more input variables that contributed to the set of attribution scores.

24. The non-transitory computer readable medium of claim 21, further comprising instructions executable by the processor for causing the processor to categorize the input variables into the input variable category.

25. The non-transitory computer readable medium of claim 24, further comprising instructions executable by the processor for causing the processor to select the input variable category from among a plurality of input variable categories based on the set of attribution scores.

26. The non-transitory computer readable medium of claim 21, wherein the suggested action comprises transmitting approval information for the data.

27. The non-transitory computer readable medium of claim 21, wherein the suggested action comprises transmitting denial information that includes the input variable category, wherein the denial information is transmitted in response to the score being greater than or equal to another predetermined threshold score.

28. The non-transitory computer readable medium of claim 21, wherein the Alternating Decision Tree is trained using the input variables.

29. The non-transitory computer readable medium of claim 21, wherein the Alternating Decision Tree is utilized after a validation operation in which scores generated by the Alternating Decision Tree based on a set of input variables are determined to be within a predefined tolerance range of scores generated by the non-linear assessment model based on the same set of input variables.

30. The non-transitory computer readable medium of claim 21, wherein the operations comprise providing the suggested action to a transaction processing system.

* * * * *